(12) United States Patent
Kelly

(10) Patent No.: US 11,232,658 B2
(45) Date of Patent: Jan. 25, 2022

(54) METHOD AND SYSTEM FOR RELAY ATTACK PREVENTION

(71) Applicant: ROBERT BOSCH (AUSTRALIA) PTY LTD, Clayton (AU)

(72) Inventor: Matthew Kelly, Victoria (AU)

(73) Assignee: ROBERT BOSCH (AUSTRALIA) PTY LTD, Clayton (AU)

( * ) Notice: Subject to any disclaimer, the term of this patent is extended or adjusted under 35 U.S.C. 154(b) by 0 days.

(21) Appl. No.: 16/765,134

(22) PCT Filed: Nov. 20, 2018

(86) PCT No.: PCT/AU2018/051242
§ 371 (c)(1),
(2) Date: May 18, 2020

(87) PCT Pub. No.: WO2019/095022
PCT Pub. Date: May 23, 2019

(65) Prior Publication Data
US 2020/0349783 A1 Nov. 5, 2020

(30) Foreign Application Priority Data
Nov. 20, 2017 (AU) .............................. 2017904678

(51) Int. Cl.
*G07C 9/00* (2020.01)
*H04B 17/318* (2015.01)
*B60R 25/24* (2013.01)

(52) U.S. Cl.
CPC ........ *G07C 9/00309* (2013.01); *B60R 25/245* (2013.01); *H04B 17/318* (2015.01);
(Continued)

(58) Field of Classification Search
CPC .................................................... G07C 9/00
See application file for complete search history.

(56) References Cited

U.S. PATENT DOCUMENTS 5,723,911 A * 3/1998 Glehr .................. H01Q 1/3241
340/10.5
6,658,328 B1 * 12/2003 Alrabady .......... G07C 9/00309
307/10.2
(Continued)

OTHER PUBLICATIONS

International Search Report for PCT/AU2018/051242, dated Feb. 4, 2019.
(Continued)

*Primary Examiner* — K. Wong
(74) *Attorney, Agent, or Firm* — Norton Rose Fulbright US LLP (57) ABSTRACT

A method and system for detecting if a relay is present in a PEPS system for a vehicle is disclosed which includes (a) transmitting a challenge signal including an LF telegram and CW signals from one or more antennas associated with a vehicle to a key fob, the CW signals being measured by the key fob; (b) determining if the CW signals measured by the key fob meet one or more criteria based on the predetermined differences in the magnetic field distribution between: (i) the magnetic field strength values associated with one or more antennas on the vehicle within the PEPS operating regions; and (ii) the magnetic field strength values associated with one or more antennas on the vehicle at the relay transmitter location when a relay is present.

14 Claims, 5 Drawing Sheets

(52) U.S. Cl.
CPC ............. *G07C 2009/00396* (2013.01); *G07C 2009/00555* (2013.01)

(56) References Cited

U.S. PATENT DOCUMENTS

| | | | | |
|---|---|---|---|---|
| 6,731,196 | B1* | 5/2004 | Ruediger | ................. G07C 9/28 |
| | | | | 340/5.61 |
| 7,161,467 | B2* | 1/2007 | Takahashi | ............... B60R 25/24 |
| | | | | 340/12.51 |
| 7,791,457 | B2* | 9/2010 | Ghabra | .................. B60R 25/24 |
| | | | | 340/426.36 |
| 9,102,296 | B2* | 8/2015 | Seiberts | .............. B60R 25/2072 |
| 9,963,109 | B2* | 5/2018 | Luo | .................... G07C 9/00309 |
| 10,196,038 | B2* | 2/2019 | Tokunaga | .............. G08C 25/02 |
| 10,308,221 | B2* | 6/2019 | Kim | ........................ B60R 25/24 |
| 10,543,808 | B2* | 1/2020 | Lin | ........................ B60R 25/00 |
| 2008/0143500 | A1 | 6/2008 | Ghabra et al. | |
| 2011/0148573 | A1 | 6/2011 | Ghabra et al. | |
| 2014/0169193 | A1 | 6/2014 | Eder et al. | |
| 2014/0215567 | A1 | 7/2014 | Yoshizawa et al. | |
| 2016/0027226 | A1 | 1/2016 | Gigl et al. | |
| 2016/0200291 | A1 | 7/2016 | Kim et al. | |
| 2016/0332597 | A1 | 11/2016 | Tokunaga et al. | |
| 2017/0158169 | A1 | 6/2017 | Luo et al. | |

OTHER PUBLICATIONS

International Preliminary Report on Patentability for PCT/AU2018/051242, dated Jul. 4, 2019.

* cited by examiner

METHOD AND SYSTEM FOR RELAY ATTACK PREVENTION

FIELD OF THE INVENTION

The present invention relates to passive entry passive start (PEPS) systems and in particular, detection and/or prevention of relay attacks on PEPS systems in vehicles used to enter and/or start the vehicle.

BACKGROUND INFORMATION

PEPS systems allow authorized users (with a valid key fob) to lock/unlock and start their vehicle without having to interact with the remote control (i.e. authorized key fob). The PEPS system may unlock or start the vehicle via a manually triggered input request (capacitive sensor, push button, etc.) if the key fob is determined to be in a valid PEPS region.

A PEPS system may define operating regions such that if an authorized key fob is located within the correct operating region then the vehicle will respond to lock/unlock and start requests. PEPS regions can be defined by using low frequency (LF) signal fields emitted from antennas on the vehicle. A received signal strength indicator (RSSI) is typically implemented in the authorized key fob as an abstraction of the magnetic field strength. The PEPS system may define the external operating regions and internal operating regions using the RSSI signal levels from the various antennas on the vehicle. If an authorized key fob is located within the correct regions, i.e., the RSSI levels correspond to a defined region then the vehicle will respond to lock/unlock and start requests.

A problem associated with PEPS systems is that vehicle thieves may utilize what is known as a "relay attack" to steal the vehicle. The relay attack tricks the PEPS system into believing that the thief is an authorized user (in a defined inclusion region).

A relay attack generally requires two thieves ("Thief A" and "Thief B") together with the authorized user (i.e., vehicle owner or other possessor of the key fob) being in the same vicinity. A relay attack involves extending the range of the LF field so that an authorized key fob which is not in proximity of the vehicle will receive the LF challenge signal. "Thief A" carries a relay receiver (to receive the LF signal) and is located close to the vehicle while "Thief B" carries the relay transmitter (to re-transmit the LF signal) and is located in close proximity to the authorized key fob. In an "analog relay", the relay receiver receives the LF signal then up-converts the frequency to a radio frequency (RF) and transmits it over an RF link to the relay transmitter. The relay transmitter receives the RF signal and then down-converts the RF signal to LF and re-transmits the LF signal to an authorized key fob. Analog relays are independent of the modulation and encoding of the LF signal. Other relay configurations are possible, for example, a "digital relay" where the relay receiver demodulates the LF signal and then the data stream is modulated over RF and transmitted. The relay transmitter demodulates the RF signal and then the data stream is modulated over LF and re-transmitted.

A key fob automatically transmits an RF response upon receiving the LF challenge. The RF response signal will typically transmit between approximately 20-200 m back to the vehicle. If the vehicle receives this response then it will assume that the key fob is in the vicinity of the vehicle and so the request will be authenticated. In addition, the relay attack method may also be applied to extend the range of the RF response range beyond the transmit range of the key fob.

In summary, in a relay attack, thieves are able to enter and start a vehicle when the key fob is outside its normal operating regions by relaying messages from one location to another to make the vehicle appear closer to the key fob.

Techniques exist which aim to prevent relay attack by analysis of the PEPS LF and UHF signals, for example, measuring the time of flight, signal vector checks and/or signal superposition, etc. These techniques are generally complicated, ineffective or expensive.

Patent document US2011/0148573A1 discusses a passive entry system which utilizes measurements of RSSI levels to establish an authorization region based upon the geometrical shape of the signal radiated from an antenna. However, this approach is only intended to detect an authentication region and will not detect whether a relay is in use so it will not prevent a relay attack from being successful.

Before turning to a summary of the present invention, it will be appreciated that the discussion of the background to the invention is included to explain the context of the invention. This is not to be taken as an admission that any of the material referred to is published, known or part of the common general knowledge.

SUMMARY OF THE INVENTION

According to a first aspect, the present invention provides, a method of detecting if a relay is present in a PEPS system for a vehicle including the steps of: (a) transmitting a challenge signal including an LF telegram and CW signals from one or more antennas associated with a vehicle to a key fob, the CW signals being measured by the key fob; (b) determining if the CW signals measured by the key fob meet one or more criteria based on the predetermined differences in the magnetic field distribution between: (i) the magnetic field strength values associated with one or more antennas on the vehicle within the PEPS operating regions; and (ii) the magnetic field strength values associated with one or more antennas on the vehicle at the relay transmitter location when a relay is present.

In addition to relay attack detection, the method of aspect one can be altered to differentiate between a relay attack and an LF noise source in close proximity to the key fob. An LF noise source, may be for example, an electronic device such as a mobile phone may alter the magnetic field distribution generated by the vehicle antennas. When the key fob is in close proximity to an electronic device, the LF noise from the device may cause the key fob to falsely detect a relay, i.e., the LF noise causes enough change to the magnetic field distribution and causes one or more of the predetermined relay detection criteria to incorrectly detect a relay. Advantageously, the present invention can be used to differentiate between a relay attack and an LF noise source in close proximity to the key fob, for example, an electronic device such as a mobile phone.

According to a second aspect, the present invention provides, a method of detecting if an LF noise source is present in a PEPS system for a vehicle including the steps of: (a) transmitting a challenge signal including an LF telegram and CW signals from one or more antennas associated with a vehicle to a key fob, the CW signals being measured by the key fob; (b) determining if the CW signals measured by the key fob meet one or more criteria based on the predetermined differences in the magnetic field distribution between: (i) the magnetic field strength values associated with one or more antennas on the vehicle within the PEPS operating regions; and (ii) the magnetic field strength values associated with one or more antennas on the vehicle within the PEPS operating regions when an LF noise source is present. In addition, the magnetic field strength values associated with one or more antennas on the vehicle at the relay transmitter location when a relay is present may be used to refine the criteria.

The criteria may be developed for each PEPS operating region individually, for example the driver door side operating region, the passenger door side operating region, etc.

The challenge signal may be transmitted as a low frequency LF signal.

The challenge signal may contain a data telegram and CW signals from one or more of the vehicle antennas transmitted sequentially.

The magnetic field strength may be represented by an RSSI measurement level of the transmitted CW signals.

The present invention exploits the fact that it is extremely difficult for a relay to reproduce the magnetic field distribution that occurs at the vehicle, i.e., to develop a perfect relay. If a non-perfect relay is used the magnetic field distribution at the vehicle is typically different from the field distribution generated by the relay. Advantageously, the present invention utilizes the LF CW (continuous wave) signal levels from different vehicle antennas to determine a series of conditions that determine whether a relay is in use.

The one or more criteria may include one or more conditional statements.

The vehicle may include antennas which are mounted in more than two orientations in relation to each other. The orientations may include one or more of parallel, orthogonal, or any other angle to each other.

According to a third aspect, the present invention provides, a system for detecting if a relay is present in a PEPS system for a vehicle including: one or more antennas associated with the vehicle for transmitting a challenge signal from the one or more antennas to a key fob; one or more controllers configured to: (a) transmit the challenge signal including an LF telegram and CW signals from one or more antennas associated with a vehicle to a key fob, the CW signals being measured by the key fob; (b) determine if the CW signals measured by the key fob meet one or more criteria based on the predetermined differences in the magnetic field distribution between: (i) the magnetic field strength values associated with one or more antennas on the vehicle within the PEPS operating regions; and (ii) the magnetic field strength values associated with one or more antennas on the vehicle at the relay transmitter location when a relay is present.

According to a fourth aspect, the present invention provides, a system for detecting if an LF noise source is present in a PEPS system for a vehicle including: one or more antennas associated with the vehicle for transmitting a challenge signal from the one or more antennas to a key fob, the CW signals being measured by the key fob; one or more controllers configured to: (a) transmit the challenge signal including an LF telegram and CW signals from one or more antennas associated with a vehicle to a key fob; (b) determine if the CW signals measured by the key fob meet one or more criteria based on the predetermined differences in the magnetic field distribution between: (i) the magnetic field strength values associated with one or more antennas on the vehicle within the PEPS operating regions; and (ii) the magnetic field strength values associated with one or more antennas on the vehicle within the PEPS operating regions when an LF noise source is present. In addition, the magnetic field strength values associated with one or more antennas on the vehicle at the relay transmitter location when a relay is present may be used to refine the criteria.

According to a fifth aspect, the present invention provides, a method of obtaining data sets and establishing criteria for use in detecting if a relay is present in a PEPS system for a vehicle including the steps of: (a) transmitting a challenge signal including an LF telegram and CW signals from one or more antennas associated with a vehicle to a key fob within a PEPS operating region; (b) measuring the magnetic field strength values associated with the challenge signal from a plurality of locations within a PEPS operating region and storing the results as a first data set; (c) inserting a relay between the vehicle and the key fob; (d) transmitting a challenge signal including an LF telegram and CW signals from one or more antennas associated with a vehicle to a key fob at the relay transmitter when a relay is in place; (e) measuring the magnetic field strength values associated with the challenge signal from a plurality of locations at the relay transmitter and storing the results as a second data set; (f) comparing the first and second data sets; and (g) generating one or more criteria based on the comparison of the two data sets. This process may be repeated for every separate PEPS operating region, for example, the driver door side operating region, the passenger door side operating region, etc.

It will be appreciated that different relays can be used between the vehicle and the key fob to generate the second data set. For example, the second data set may include data obtained when a particular relay was used between the vehicle and the key fob and also include the data obtained when other relay topologies were used between the vehicle and the key fob.

According to a sixth aspect, the present invention provides, a method of obtaining data sets and establishing criteria for use in detecting if an LF noise source is present in a PEPS system for a vehicle including the steps of: (a) transmitting a challenge signal including an LF telegram and CW signals from one or more antennas associated with a vehicle to a key fob within a PEPS operating region; (b) measuring the magnetic field strength values associated with the challenge signal from a plurality of locations within a PEPS operating region and storing the results as a first data set; (c) inserting an LF noise source in proximity to the key fob within a PEPS operating region; (d) transmitting a challenge signal including an LF telegram and CW signals from one or more antennas associated with a vehicle to a key fob within a PEPS operating region where an LF noise source is in close proximity to the key fob; (e) measuring the magnetic field strength values associated with the challenge signal from a plurality of locations within a PEPS operating region where an LF noise source is in close proximity to the key fob and storing the results as a second data set; (f) comparing the first and second data sets; and (g) generating one or more criteria based on the comparison of the two data sets. This process may be repeated for every separate PEPS operating region, for example, the driver door side operating region, the passenger door side operating region, etc. In addition, the data set obtained by measuring the magnetic field strength values associated with the challenge signal from a plurality of locations at the relay transmitter may also be used to refine the criteria.

It will be appreciated that different LF noise sources can be used to generate the second data set.

It will be appreciated that a controller can be located in the vehicle only or in both the vehicle and key fob.

DETAILED DESCRIPTION

Figure 1:
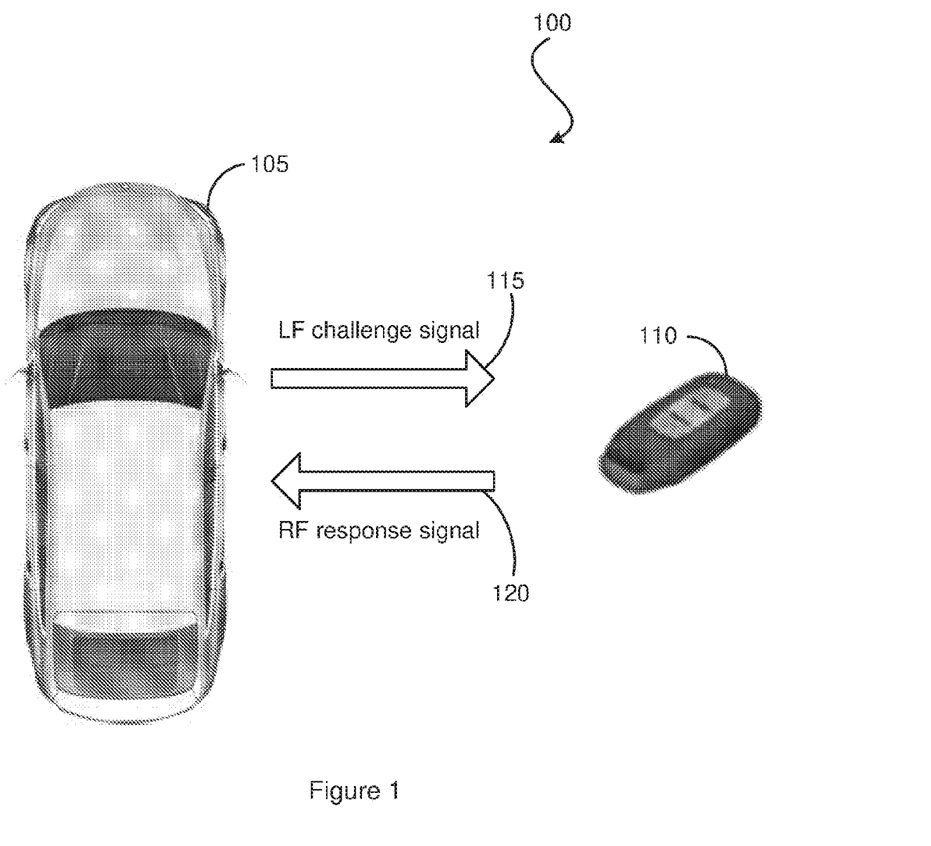
FIG. 1 is a schematic diagram illustrating a vehicle PEPS system.

FIG. 1 is a schematic diagram illustrating a vehicle PEPS system 100. The PEPS system 100 allows a vehicle owner (or possessor of the key fob) to lock/unlock and start a vehicle 105 without having to interact with the key fob 110. Typical PEPS systems define external operating regions and internal operating regions. If a key fob 110 is located within an operating region then the vehicle 105 will respond to lock/unlock and start requests.

The PEPS operating regions may be defined by low frequency (LF) signal magnetic fields emitted from antennas on the vehicle. Received signal strength indicator (RSSI) can be utilized in the key fob and the PEPS system may define the external operating regions and internal operating regions using the RSSI signal levels measured from the various antennas on the vehicle 105. Then, if a key fob 110 is located within the correct regions (i.e., the RSSI levels correspond to a defined operating region) then the vehicle 105 will respond to the lock/unlock and start request.

PEPS systems may be configured to have manually triggered unlock and start requests (such as a capacitive sensor, push button and the like provided for example, in the handle of the vehicle, or in the vehicle Start/Stop button 105) to transmit the LF challenge signal 115 to the key fob 110. As part of the LF challenge signal 115, signals are transmitted from several (or all) of the vehicle antennas. If a key fob 110 is located within the expected operating regions (based on the RSSI values measured from the vehicle antennas), after receiving the LF challenge signal 115 it will transmit an authentication response signal on a radio frequency (RF) 120 for the request to be processed in the vehicle. It will be appreciated that bi-directional RF communication may also be used.

Some PEPS systems also provide permanent periodically transmitted LF challenge signals 115 prior to the manually triggered unlock request. For these systems, the vehicle knows when the key fob 110 is in the vicinity of the vehicle before an unlock request is made. The advantage of this is that it can improve system response times and provide additional features such as comfort lighting as the owner approaches the vehicle 105.

Figure 2:
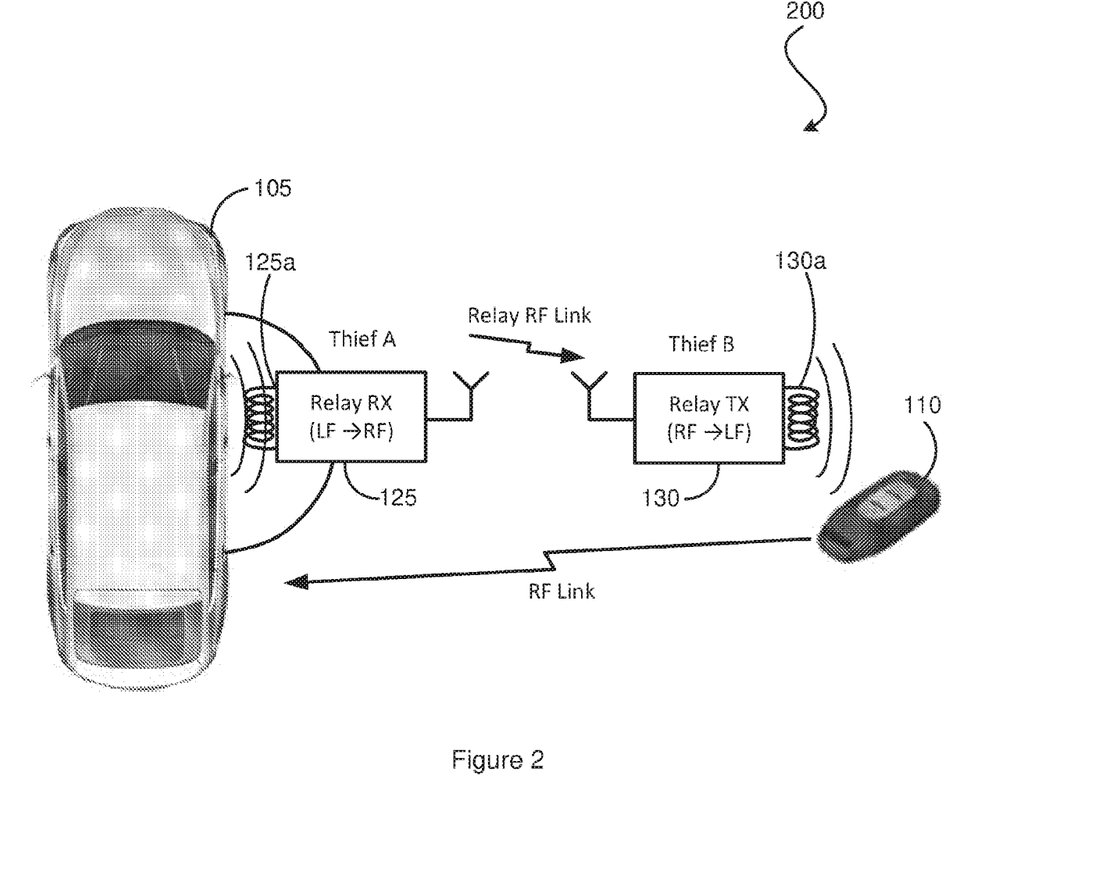
FIG. 2 is a schematic diagram illustrating a relay attack on a vehicle having a PEPS system.

As shown in the FIG. 2, the PEPS system 200 is vulnerable to theft due to what is known as "relay attack". The present invention attempts to prevent a relay attack from being successful. In FIG. 2, the relay attack involves extending the range of the LF field (shown in FIG. 1) so that a key fob 110 which is not in proximity of the vehicle 105 will receive the LF challenge signal. The relay attack requires two thieves, Thief A and Thief B where Thief A carries a relay receiver (Relay RX) 125 and is located close to the vehicle 105 while Thief B carries a relay transmitter (Relay TX) 130 and is located close to the key fob 110.

Relay RX 125 receives an LF signal from vehicle 105 and then up-converts the frequency to an RF frequency and transmits it via RF link to Relay TX 130. Relay TX 130 receives the RF signal and then down-converts the frequency to LF and re-transmits the LF signal to the key fob 110. This scenario describes the previously defined "analog relay", however, other types of relays could be used. The key fob 110 automatically transmits an RF response upon receiving the LF challenge. The RF response signal will typically transmit between approximately 20-200 m back to the vehicle 105. If the vehicle 105 receives this response it will assume that the key fob 110 is in the vicinity of the vehicle 105 and so the request will be authenticated. In addition, the relay attack method may also be applied to extend the range of the RF response range beyond the transmit range of the key fob 110.

Figure 3:
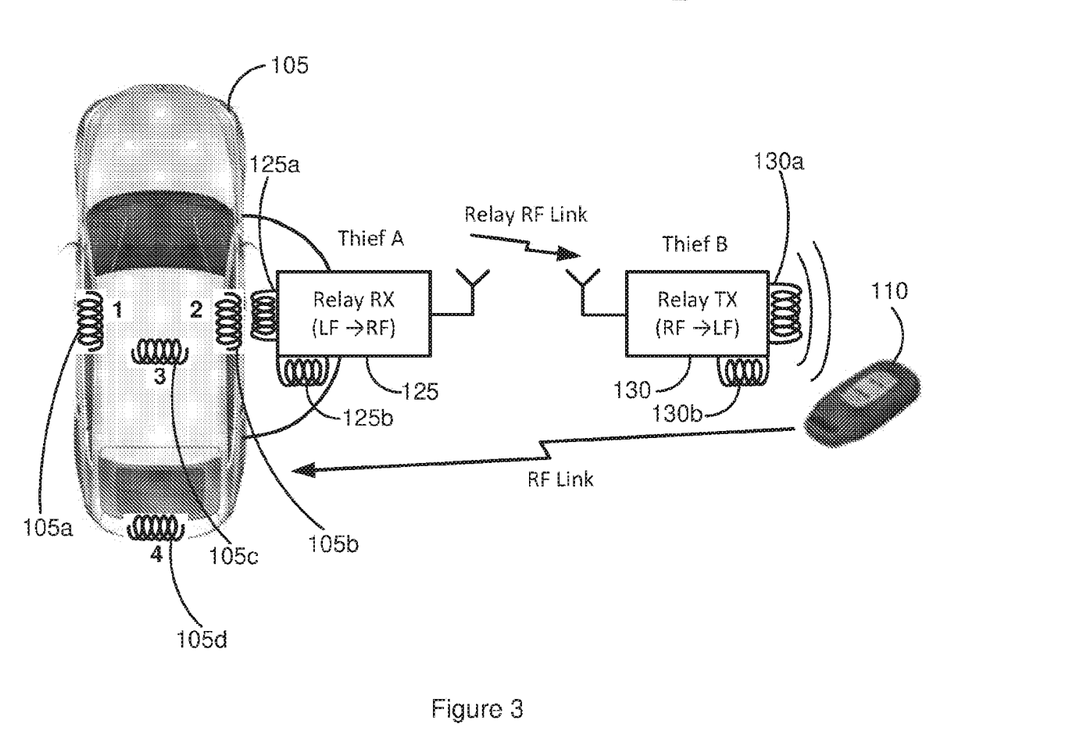
FIG. 3 is a schematic diagram illustrating a relay attack on a vehicle having a PEPS system where the relays have two antennas mounted orthogonally to each other.

The relay attack shown in FIG. 2 is a simplified version of a relay attack known as a one dimensional relay attack. However, in operation as shown in FIG. 3, a vehicle 105 has several antennas in the vehicle 105 typically mounted in two orientations in relation to each other i.e. parallel or orthogonal to each other, known as a two dimensional relay attack. As shown in FIG. 3, typical antenna orientations for a vehicle 105 may be for example antenna 105a, 105b parallel to each other and located in the door handles while antenna 105c, 105d are parallel to each other and are located in the cabin and trunk of the vehicle respectively (although it will be appreciated that there may be more sets of antennas provided). For a vehicle such as this a relay needs two antennas mounted orthogonally to each other in order to effectively couple energy from the vehicle antennas into the relay RX for both vehicle antenna orientations and for the relay TX to attempt to effectively reproduce the LF field distribution at the vehicle. In practice, a more sophisticated relay attack will involve a relay receiver 125 having antennas 125a and 125b and relay transmitter 130 having antennas 130a and 130b to replicate the antenna orientations in the vehicle 105.

In practice, it is extremely difficult for a relay 125 and 130 to reproduce the magnetic field distribution that occurs at the vehicle 105, that is to say it is very difficult to develop a perfect relay. The present invention constructs a relay and compares RSSI results from the relay to that obtained at the vehicle when no relay is in operation. The present invention utilizes an LF challenge consisting of a data telegram and CW signal levels transmitted sequentially from the different vehicle antennas 105a, 105b, 105c, 105d to determine a series of conditions that determine whether a relay (typically non-perfect relay) is in use.

In the present invention, RSSI levels of each of the CW signals from the vehicle antennas 105a, 105b, 105c and 105d can be measured by the key fob 110 and the RSSI data included in the RF response signal from the key fob 110. This data can be stored and collected by a controller associated with the system and vehicle 105. The controller may take any suitable form and may for example control operation of the antennas and the PEPS system that communicates with the key fob 110 can be utilized by a computer running an application software program. The controller may be configured to store data relating to the RF responses and may be further configured to open/lock the doors and or start the vehicle 105 and the like.

The key fob may be placed at many positions within the entry or start regions and RSSI levels and data are stored for each position measured. Essentially, this builds up a data set of RSSI levels of the key fob 110 in different positions.

As noted above, a relay attack involves extending the range of the vehicle LF field so that a key fob 110 which is not in proximity of the vehicle will receive the LF challenge signal. Since the vehicle 105 has several antennas 105a, 105b, 105c, 105d, for example, mounted in two typical orientations (i.e. parallel or orthogonal to each other) the relay 125 may only use one pickup and transmit antenna but ideally requires two antennas mounted orthogonally to each other in order to better represent the vehicle antenna orientations.

The present invention further provides data relating to RSSI values when a relay 125, 130 in use with key fob 110. The present invention measures the relayed CW signals at the key fob 110 and stores that data. The RSSI results from the signals determined when there is no relay in use (first data set) and when there is a relay in use (second data set) are compared and analysed to determine a series of conditions that determine whether or not a relay is in use.

For example, for a particular make and model of vehicle, a number of measurements are made with the key fob 110 in various positions around the vehicle 105. Further measurements are made at the Relay TX 130 while a relay is in place. This provides two data sets—one where the key fob is operating normally and one where a relay attack is taking place.

In FIG. 3, since there are four vehicle antennas 105a, 105b, 105c and 105d (although it may be appreciated that there may be more than four antennas), each data set would consist of four RSSI measurement results for each key fob location measured. RSSI measurements from antennas 105a, 105b, 105c and 105d for each position of the key fob 110 are made within a PEPS operating region at the vehicle to generate a first data set. A relay is the inserted between the vehicle and the key fob and RSSI measurements from antennas 105a, 105b, 105c and 105d for each position of the key fob 110 are made at the relay transmitter to generate a second data set. It will be appreciated that different relays can be used between the vehicle and the key fob to generate the second data set. For example, the second data set may include data obtained when a one dimensional relay was used between the vehicle and the key fob and also the data obtained when a two dimensional relay was used between the vehicle and the key fob. The first and second data sets can then be compared. Criteria can be obtained to define the differences in the two data sets by comparing the data set obtained at the vehicle 105 to the data set obtained at the Relay TX 1130. For example, it may be observed that where the key fob 110 is operating normally (i.e. without a relay):

a. When the RSSI of antenna 105a was greater than 300, the RSSI level from antenna 105b was always more than 25 counts greater than the RSSI from antenna 105c To continue with the example, when a relay was in place, the key fob 110 when located at the Relay TX 130:

b. When the antenna 105a has an RSSI greater than 300, the RSSI from antenna 105b is always less than or equal to 25 counts than antenna 105c.

Each criteria, which may take the form of a rule or conditional statement may be provided in a lookup table or the like or via data stored in a controller associated with the system such that the following criteria is provided for the previous example:

IF RSSI from antenna 105a>300 THEN (antenna 105b RSSI–antenna 105c RSSI)>25;

If the above statement returns TRUE then no relay is present otherwise if the above statement returns FALSE, a relay is present.

As will be appreciated this is one example of many and a number of conditions or statements may be deduced from comparing the data sets. A number of conditional statements may be identified and may be utilized. The conditional statements are developed to compensate for RSSI tolerances in order to ensure that "false" relay detections are not made when the vehicle is in normal operation (i.e. when no relay is present), i.e., eliminating the possibility of false positives.

In operation, the PEPS system 100 defines external operating regions and internal operating regions using the RSSI signal levels from the various antennas on the vehicle 105. If an authorized key fob 110 is located within the correct regions, the RSSI levels correspond and the vehicle will respond to lock/unlock and start requests. However, the present invention adds an additional step, namely determining if criteria are satisfied and if the request is therefore valid. If the system determines that a relay is in place, then the PEPS entry/start request is not performed.

It will be appreciated that there may be a situation where a relay can perfectly reproduce the LF challenge signals present at the vehicle 105. However, the relay can only achieve this when the key fob 110 is at a specific distance from the TX relay 130. If this distance is not maintained, the "perfect" relay can be exposed utilizing the method and system of the present invention. This is because the antenna placements in a "perfect relay" must be constructed to a physical dimension smaller than the antenna placements in a typical vehicle size so that the thieves can conceal the relay from the public to avoid raising suspicion. Since the relay antenna positions cannot truly represent the real distances between the antennas in the vehicle, the relay cannot perfectly reproduce the correct LF signal levels for all distances between the key fob and TX relay.

Figure 4:
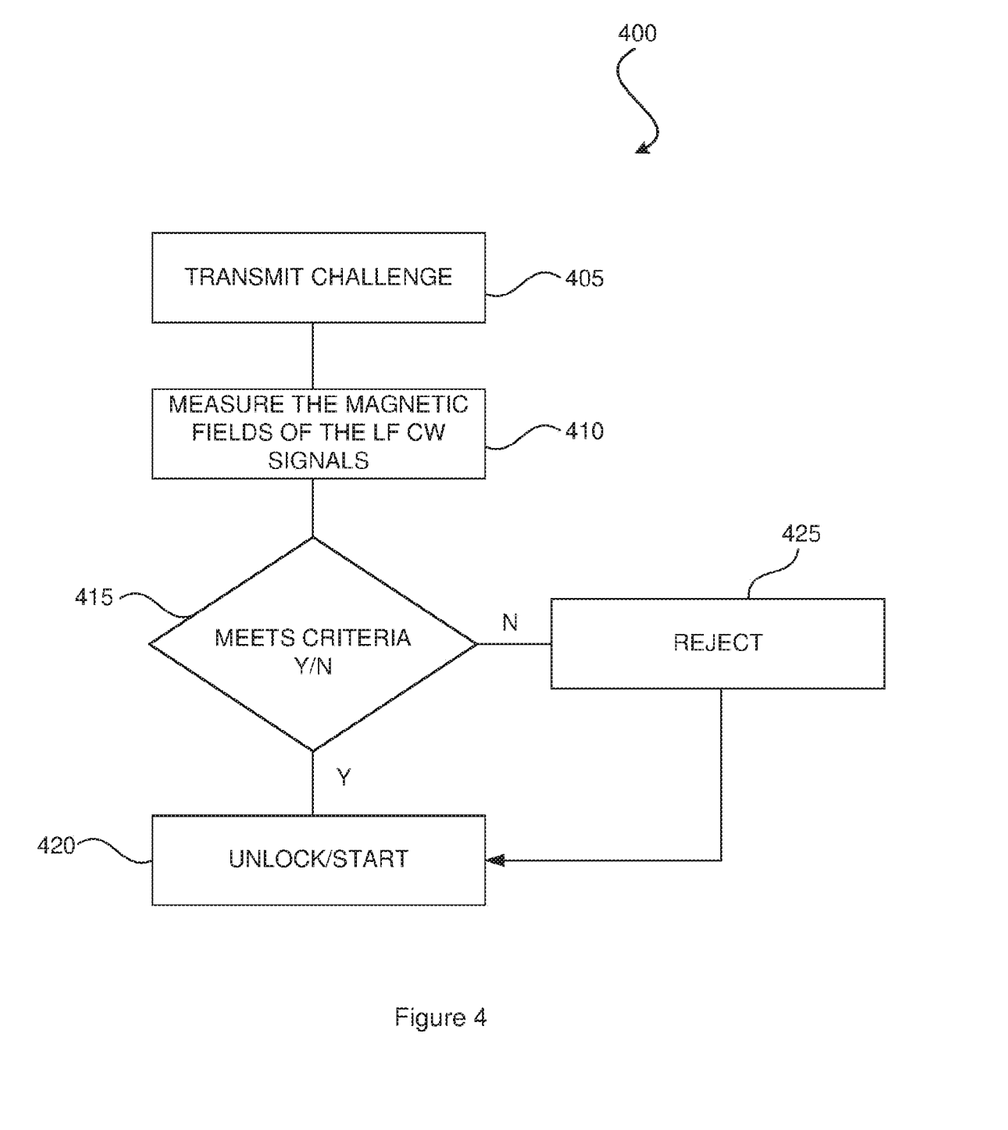
FIG. 4 is a flow diagram illustrating the method of the present invention to in preventing a relay attack on a vehicle having a PEPS system.

FIG. 4 is a flow diagram illustrating operation of the method 400 of the present invention in which it is determined whether or not a relay is present in a PEPS system for a vehicle. At step 405, a challenge signal is transmitted from the vehicle to a key fob. The challenge signal includes LF transmissions from one or more of the vehicle antennas. It will be appreciated that any number of suitable antennas may be used (including all of the vehicle antennas—if required). Control then moves to step 410 in which the key fob 110 receives the challenge signal 115 and in response to the challenge signal 115 measures the magnetic field strength of the LF CW signals from the vehicle antennas and provides a response signal (shown as 120 in FIG. 1). The response signal 120 is typically an RF signal and contains the magnetic field data measured at the location of the key fob 110 relative to the vehicle 105.

Control then moves to step 415 where it is determined whether or not the measured magnetic field data meets one or more criteria based on the predetermined differences in the magnetic field distribution between:

(i). the magnetic field strength values associated with one or more antennas on the vehicle within the PEPS operating regions and (ii). the magnetic field strength values associated with the one or more antennas on the vehicle at the relay transmitter location when a relay is present.

These pre-determined magnetic field strength values when a relay is present and when a relay is absent may be stored in a lookup table or the like associated with a controller in the vehicle 105, or alternatively this can associated with a controller in the keyfob 110.

It can then be determined whether or not the magnetic fields measured by the key fob 110 meet the criteria (i.e., are the values valid or do they correspond to a relay attack).

If it is determined that the magnetic field strength values do not meet the criteria then the request is rejected and control moves to step 425 where the key fob is locked-out for a time period or other appropriate action is taken.

Otherwise if at step 415 it is determined that the response signal meets the one or more criteria then control moves to step 420 where the vehicle may be unlocked or started.

It will be appreciated that the magnetic field strength may be measured in any suitable way such as an RSSI measurement level which is essentially a quantised abstraction of the magnetic field strength.

It will also be appreciated that the method 400 may loop so for example at step 415, criteria may be periodically polled against the key fob 110 in the event that the key fob is moving, as previously discussed with reference to FIG. 3, the distance between the key fob and relay TX must be at a specific distance; this is harder to achieve for multiple measurements and the criteria could be applied more frequently to reject or prevent access to the vehicle.

Figure 5:
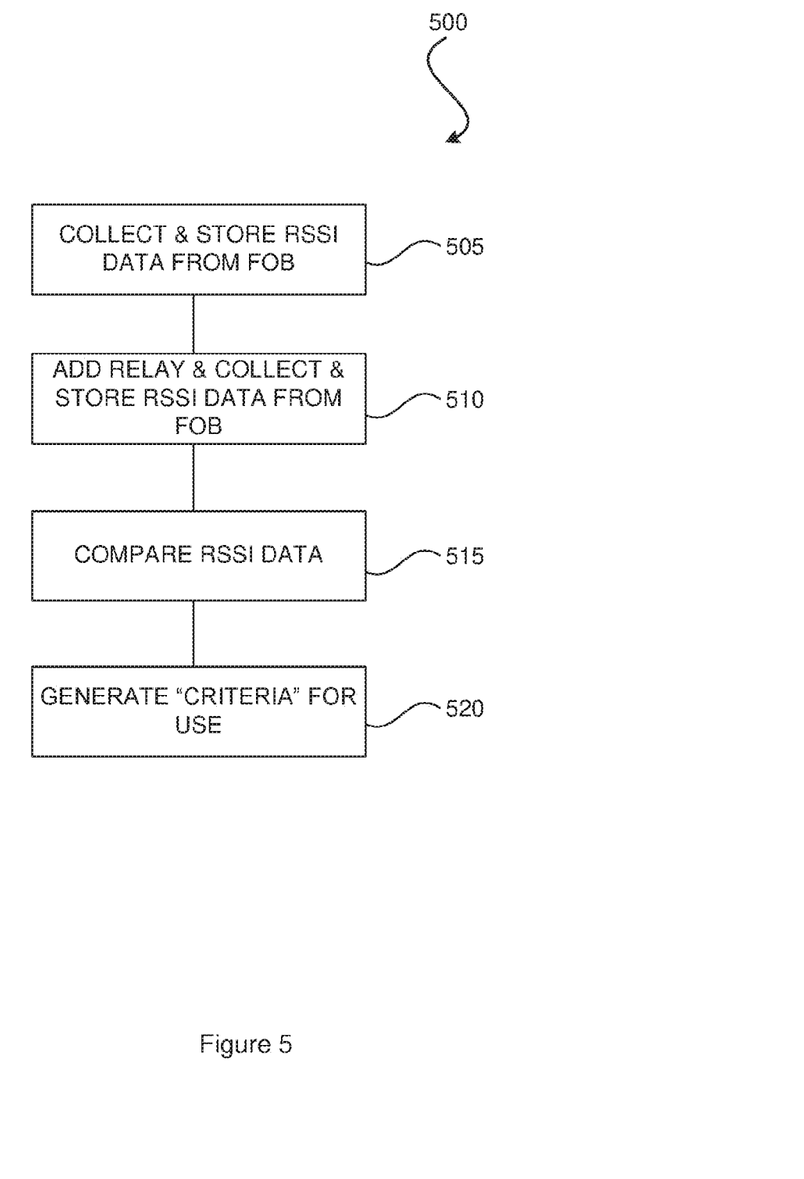
FIG. 5 is a flow diagram illustrating the method of the present invention to obtain data sets for use with the system and method of the present invention.

FIG. 5 is a flow diagram illustrating a method 500 of the present invention to obtain data sets for use with the system and method of the present invention as described with reference to FIG. 3. The present invention utilizes information from two data sets—a first data set (which is magnetic field strength field values) from many positions measured when using a key fob in the PEPS operating regions and a second data set (which is magnetic strength field strength values) measured at the TX Relay 130 when using a relay between the vehicle and key fob.

Step 505, includes transmitting a challenge signal including LF signals from one or more of the antennas associated with a vehicle to a key fob and receiving a response signal from the key fob in response to the challenge signal, wherein the response signal includes the magnetic field strength of the challenge signals at the location of the key fob—this process is repeated at many positions within the operating regions and provides a first data set. The data may be stored at a controller associated with the vehicle, or within the key fob or the like as described previously.

At step 510, a challenge signal is transmitted including LF signals from one or more of the antennas associated with a vehicle to a key fob where a relay is in place and a response signal is received from the key fob in response to the challenge signal, wherein the response signal includes the magnetic field strength of the challenge signal at the location of the key fob at the relay transmitter—this process is repeated at many positions at the relay transmitter for the vehicle operating regions and provides a second data set. The data may be stored at a controller associated with the vehicle, or within the key fob or the like as described previously.

It will be appreciated that different relays can be used between the vehicle and the key fob to generate the second data set. For example, the second data set may include data obtained when a one dimensional relay was used between the vehicle and the key fob and also the data obtained when a two dimensional relay was used between the vehicle and the key fob.

At step 515, the first and second data sets are analysed and compared before a number of criteria or conditional statements are generated. The conditional statements will then determine whether or not a relay is being used with the PEPS system as described with reference to FIG. 3.

It will be appreciated that the steps of FIG. 5 can be performed with an LF noise source in place instead of a relay. In addition to relay attack detection, criteria may be used to differentiate between a relay attack and an LF noise source in close proximity to the key fob, for example, an electronic device such as a mobile phone. Advantageously, the present invention may then be used to detect an LF noise source as well as preventing a relay detection from occurring when LF noise is introduced into the system. Criteria, which may take the form of a rule or conditional statement described above, may be provided in a lookup table or the like or via data stored in a controller associated with the system.

The claims defining the invention are as follows:

1. A method of detecting if a relay is present in a PEPS system for a vehicle, the method comprising:
    (a) transmitting a challenge signal including an LF telegram and CW signals from one or more antennas associated with a vehicle to a key fob, the CW signals being measured by the key fob; and
    (b) determining if the CW signals measured by the key fob meet one or more criteria based on the predetermined differences in the magnetic field distribution between:
        (i) the magnetic field strength values associated with one or more antennas on the vehicle within the PEPS operating regions; and
        (ii) the magnetic field strength values associated with one or more antennas on the vehicle at the relay transmitter location when a relay is present;
    wherein predefined magnetic field strength value ranges, which are acceptable, are obtained by a predetermined comparison of magnetic filed strength values, under normal use between the vehicle and key fob without a relay, and other magnetic field strength levels, which are obtained when a relay is inserted between the vehicle and the key fob.

2. A method of detecting if an LF noise source is present in a PEPS system for a vehicle, the method comprising:
    (a) transmitting a challenge signal including an LF telegram and CW signals from one or more antennas associated with a vehicle to a key fob, the CW signals being measured by the key fob; and
    (b) determining if the CW signals measured by the key fob meet one or more criteria based on the predetermined differences in the magnetic field distribution between:
        (i) the magnetic field strength values associated with one or more antennas on the vehicle within the PEPS operating regions; and
        (ii) the magnetic field strength values associated with one or more antennas on the vehicle within the PEPS operating regions when an LF noise source is present;
    wherein predefined magnetic field strength value ranges, which are acceptable, are obtained by a predetermined comparison of magnetic field strength values, under normal use between the vehicle and key fob without a relay, and other magnetic field strength levels, which are obtained when a relay is inserted between the vehicle and the key fob.

3. The method of claim 1, wherein the criteria are developed for each PEPS operating region individually.

4. The method of claim 1, wherein the one or more criteria includes one or more conditional statements.

5. The method of claim 1, wherein the magnetic field strength is represented by an RSSI measurement level.

6. The method of claim 1, wherein the challenge signal is transmitted as a low frequency LF signal.

7. The method of claim 1, wherein signals other than CW signals are transmitted by the vehicle antennas for the magnetic field strength measurements.

8. A system for detecting if a relay is present in a PEPS system for a vehicle, comprising:

one or more antennas associated with the vehicle for transmitting a challenge signal from the one or more antennas to a key fob; and one or more controllers, each of which is configured to perform the following:
- (a) transmit the challenge signal including an LF telegram and CW signals from one or more antennas associated with a vehicle to a key fob, the CW signals being measured by the key fob; and
- (b) determine if the CW signals measured by the key fob meet one or more criteria based on the predetermined differences in the magnetic field distribution between:
  - (i) the magnetic field strength values associated with one or more antennas on the vehicle within the PEPS operating regions; and
  - (ii) the magnetic field strength values associated with one or more antennas on the vehicle at the relay transmitter location when a relay is present;
  - wherein predefined magnetic field strength value ranges, which are acceptable, are obtained by a predetermined comparison of magnetic field strength values, under normal use between the vehicle and key fob without a relay, and other magnetic field strength levels, which are obtained when a relay is inserted between the vehicle and the key fob.

9. A system for detecting if an LF noise source is present in a PEPS system for a vehicle, comprising:

one or more antennas associated with the vehicle for transmitting a challenge signal from the one or more antennas to a key fob, wherein the CW signals are measured by the key fob; and one or more controllers, each of which is configured to perform the following:
- (a) transmitting the challenge signal including an LF telegram and CW signals from one or more antennas associated with a vehicle to a key fob; and
- (b) determining if the CW signals measured by the key fob meet one or more criteria based on the predetermined differences in the magnetic field distribution between:
  - (i) the magnetic field strength values associated with one or more antennas on the vehicle within the PEPS operating regions; and
  - (ii) the magnetic field strength values associated with one or more antennas on the vehicle within the PEPS operating regions when an LF noise source is present;
  - wherein predefined magnetic field strength value ranges, which are acceptable, are obtained by a predetermined comparison of magnetic field strength values, under normal use between the vehicle and key fob without a relay, and other magnetic field strength levels, which are obtained when a relay is inserted between the vehicle and the key fob.

10. The system of claim 8, wherein the controller is located in the vehicle.

11. The system of claim 8, wherein the controller is located in both the vehicle and the key fob.

12. A method of obtaining data sets and establishing criteria for use in detecting if a relay is present in a PEPS system for a vehicle, the method comprising:
- (a) transmitting a challenge signal including an LF telegram and CW signals from one or more antennas associated with a vehicle to a key fob within a PEPS operating region;
- (b) measuring the magnetic field strength values associated with the challenge signal from a plurality of locations within a PEPS operating region and storing the results as a first data set;
- (c) inserting a relay between the vehicle and the key fob;
- (d) transmitting a challenge signal including an LF telegram and CW signals from one or more antennas associated with a vehicle to a key fob at the relay transmitter when a relay is in place;
- (e) measuring the magnetic field strength values associated with the challenge signal from a plurality of locations at the relay transmitter and storing the results as a second data set;
- (f) comparing the first and second data sets; and
- (g) generating one or more criteria based on the comparison of the two data sets;
- wherein predefined magnetic field strength value ranges, which are acceptable, are obtained by a predetermined comparison of magnetic field strength values, under normal use between the vehicle and key fob without a relay, and other magnetic field strength levels, which are obtained when a relay is inserted between the vehicle and the key fob.

13. A method of obtaining data sets and establishing criteria for use in detecting if an LF noise source is present in a PEPS system for a vehicle, the method comprising:
- (a) transmitting a challenge signal including an LF telegram and CW signals from one or more antennas associated with a vehicle to a key fob within a PEPS operating region;
- (b) measuring the magnetic field strength values associated with the challenge signal from a plurality of locations within a PEPS operating region and storing the results as a first data set;
- (c) inserting an LF noise source in proximity to the key fob within a PEPS operating region;
- (d) transmitting a challenge signal including an LF telegram and CW signals from one or more antennas associated with a vehicle to a key fob within a PEPS operating region where an LF noise source is in close proximity to the key fob;
- (e) measuring the magnetic field strength values associated with the challenge signal from a plurality of locations within a PEPS operating region where an LF noise source is in close proximity to the key fob and storing the results as a second data set;
- (f) comparing the first and second data sets; and
- (g) generating one or more criteria based on the comparison of the two data sets;
- wherein predefined magnetic field strength value ranges, which are acceptable, are obtained by a predetermined comparison of magnetic field strength values, under normal use between the vehicle and key fob without a relay, and other magnetic field strength levels, which are obtained when a relay is inserted between the vehicle and the key fob.

14. The method of claim 12, wherein steps (a) to (g) are repeated for each PEPS operating region.

* * * * *